US010771388B2

(12) United States Patent
Toncelli

(10) Patent No.: US 10,771,388 B2
(45) Date of Patent: Sep. 8, 2020

(54) MACHINE FOR SMOOTHING AND/OR POLISHING SLABS OF STONE MATERIAL, SUCH AS NATURAL OR AGGLOMERATED STONE, CERAMIC AND GLASS

(71) Applicant: Luca Toncelli, Bassano del Grappa (IT)

(72) Inventor: Luca Toncelli, Bassano del Grappa (IT)

(*) Notice: Subject to any disclaimer, the term of this patent is extended or adjusted under 35 U.S.C. 154(b) by 503 days.

(21) Appl. No.: 15/102,562

(22) PCT Filed: Dec. 12, 2014

(86) PCT No.: PCT/IB2014/066854
§ 371 (c)(1),
(2) Date: Jun. 8, 2016

(87) PCT Pub. No.: WO2015/087294
PCT Pub. Date: Jun. 18, 2015

(65) Prior Publication Data
US 2017/0005933 A1      Jan. 5, 2017

(30) Foreign Application Priority Data

Dec. 13, 2013  (IT) .............................. TV2013A0208
Jan. 31, 2014  (IT) .............................. TV2014A0021

(51) Int. Cl.
*H04L 12/801*     (2013.01)
*B24B 41/047*     (2006.01)
(Continued)

(52) U.S. Cl.
CPC .............. *H04L 47/11* (2013.01); *B24B 7/005* (2013.01); *B24B 7/06* (2013.01); *B24B 7/224* (2013.01);
(Continued)

(58) Field of Classification Search
CPC ............ B24B 27/0023; B24B 27/0076; B24B 41/0475; B24B 7/005; B24B 7/06;
(Continued)

(56) References Cited

U.S. PATENT DOCUMENTS 2,788,617 A * 4/1957 Peckett ................... B24B 7/224
451/154
2,837,876 A * 6/1958 Kocher ................... B24B 9/102
451/301
(Continued)

FOREIGN PATENT DOCUMENTS

CN           2240430 Y      11/1996
CN       201279709 Y  *    7/2009
(Continued)

OTHER PUBLICATIONS

Espacenet, Translation of CN201279709 (Year: 2019).*
(Continued)

*Primary Examiner* — Orlando E Aviles
*Assistant Examiner* — Thomas Raymond Rodgers
(74) *Attorney, Agent, or Firm* — Fredrickson & Byron, P.A.

(57) ABSTRACT

A machine (10) for grinding and/or polishing slabs of stone material, such as natural or agglomerated stone, ceramics or glass, comprises: a support bench (12) for the slabs to be machined. At least one working station (14) is provided above the support bench (12), said station comprising at least one pair of bridge support structures (16, 18) situated opposite each and arranged transversely on either side of the support bench (12). First means (19) are provided for performing a relative movement in the longitudinal direction of machining station (14) and slab on the support bench (12). The machine further comprises at least one beam (20, the two ends (22, 24) of which are supported by the support (Continued)

structures (16, 18), and at least one rotating spindle (26) with a sliding vertical axis mounted on the at least one beam (20). The beam (20) is movable transversely on the support structures (16, 18). The bottom end of the spindle (26) is provided with at least one tool-carrying support (28) rotating about the axis of rotation of the spindle (26). The machine is characterized in that it comprises second means (32) for performing a relative movement in the longitudinal direction of the at least one spindle (26) with respect to the support bench (12).

19 Claims, 9 Drawing Sheets

(51) Int. Cl.
| | | |
|---|---|---|
| *B24B 27/00* | (2006.01) | |
| *B24B 7/22* | (2006.01) | |
| *B24B 7/00* | (2006.01) | |
| *B24B 7/24* | (2006.01) | |
| *B24B 7/06* | (2006.01) | |
| *H04L 12/825* | (2013.01) | |
| *H04L 29/06* | (2006.01) | |

(52) U.S. Cl.
CPC .......... *B24B 7/247* (2013.01); *B24B 27/0023* (2013.01); *B24B 27/0076* (2013.01); *B24B 41/0475* (2013.01); *H04L 47/26* (2013.01); *H04L 47/29* (2013.01); *H04L 69/161* (2013.01); *H04L 69/22* (2013.01)

(58) Field of Classification Search
CPC .. B24B 7/12; B24B 7/22; B24B 7/224; B24B 9/002; B24B 9/102; B24B 27/0015; B24B 14/002; B24B 41/02; B24B 41/047; B24B 47/02; B24B 47/20; H04L 47/11; H04L 47/26; H04L 69/161; H04L 69/22; H04L 47/29
USPC ......... 125/25, 35, 30.01; 451/124, 150, 160, 451/260, 336, 907
See application file for complete search history.

(56) References Cited

U.S. PATENT DOCUMENTS

| | | | | | |
|---|---|---|---|---|---|
| 3,300,906 | A | * | 1/1967 | Young | .................... B24B 7/224 451/158 |
| 3,546,818 | A | * | 12/1970 | Beck | ...................... B24B 7/224 451/160 |
| 4,375,738 | A | * | 3/1983 | Bando | ....................... B24B 9/10 451/270 |
| 4,833,832 | A | * | 5/1989 | Lindsey | .................. B24B 7/224 451/158 |
| 4,914,870 | A | * | 4/1990 | Toncelli | .................... B24B 7/22 125/27 |
| 2003/0092359 | A1 | * | 5/2003 | Pedrini | ................... B24B 7/224 451/5 |
| 2006/0045011 | A1 | * | 3/2006 | Aghvami | ................ H04L 47/10 370/230 |
| 2007/0082586 | A1 | * | 4/2007 | Ferrari | ...................... B24B 7/00 451/28 |
| 2008/0159129 | A1 | * | 7/2008 | Songhurst | ............... H04L 47/10 370/229 |
| 2011/0069616 | A1 | * | 3/2011 | Revels | .................... H04L 47/10 370/236 |
| 2013/0137346 | A1 | * | 5/2013 | Toncelli | .................... B24B 7/06 451/150 |
| 2013/0227163 | A1 | * | 8/2013 | Prabhakar | ........... H04L 43/0882 709/233 |
| 2014/0269288 | A1 | * | 9/2014 | Crisan | ................. H04L 47/2425 370/231 |
| 2015/0029887 | A1 | * | 1/2015 | Briscoe | ................. H04L 47/326 370/252 |

FOREIGN PATENT DOCUMENTS

| | | |
|---|---|---|
| CN | 201279709 Y | 7/2009 |
| CN | 201405450 Y | 2/2010 |
| CN | 201856147 U | 6/2011 |
| DE | 3826655 A1 | 3/1989 |
| EP | 1500467 A1 | 1/2005 |
| EP | 1772232 A1 | 4/2007 |
| WO | 2011064706 A1 | 6/2011 |

OTHER PUBLICATIONS

PCT International Search Report dated Apr. 15, 2015 for Intl. App. No. PCT/IB2014/066854, from which the instant application is based, 4 pgs.

Italian Search Report and Written Opinion dated Oct. 10, 2014 for related IT App. No. TV20140021, 7 pgs.

* cited by examiner

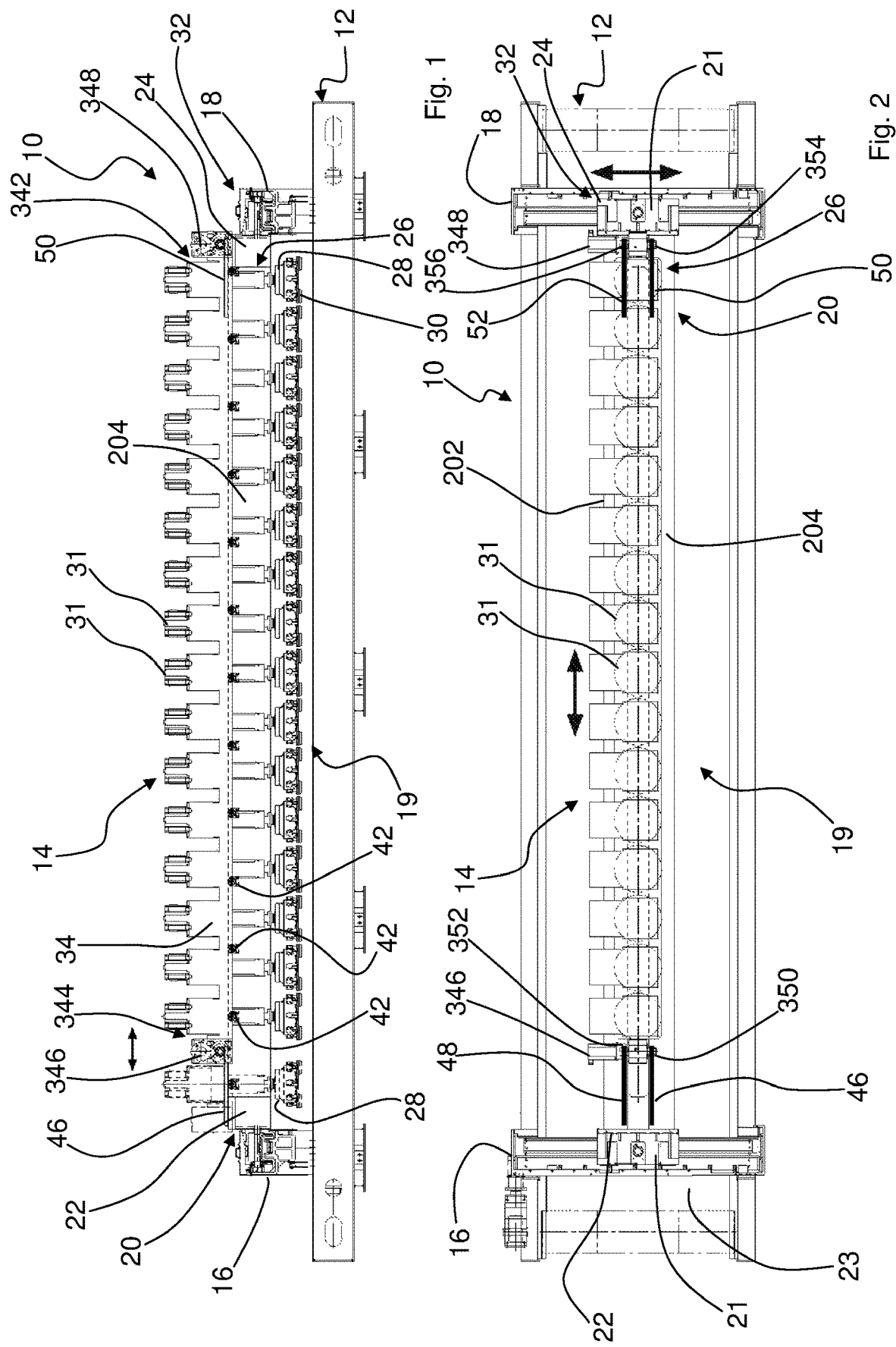

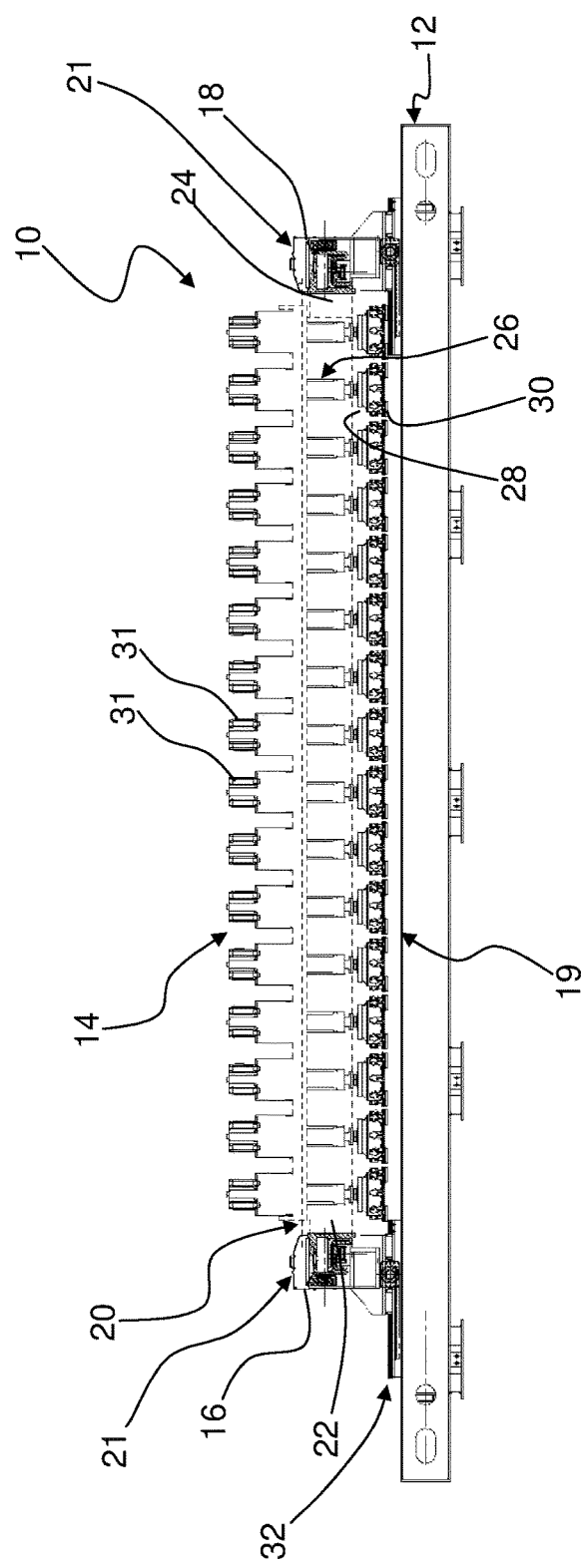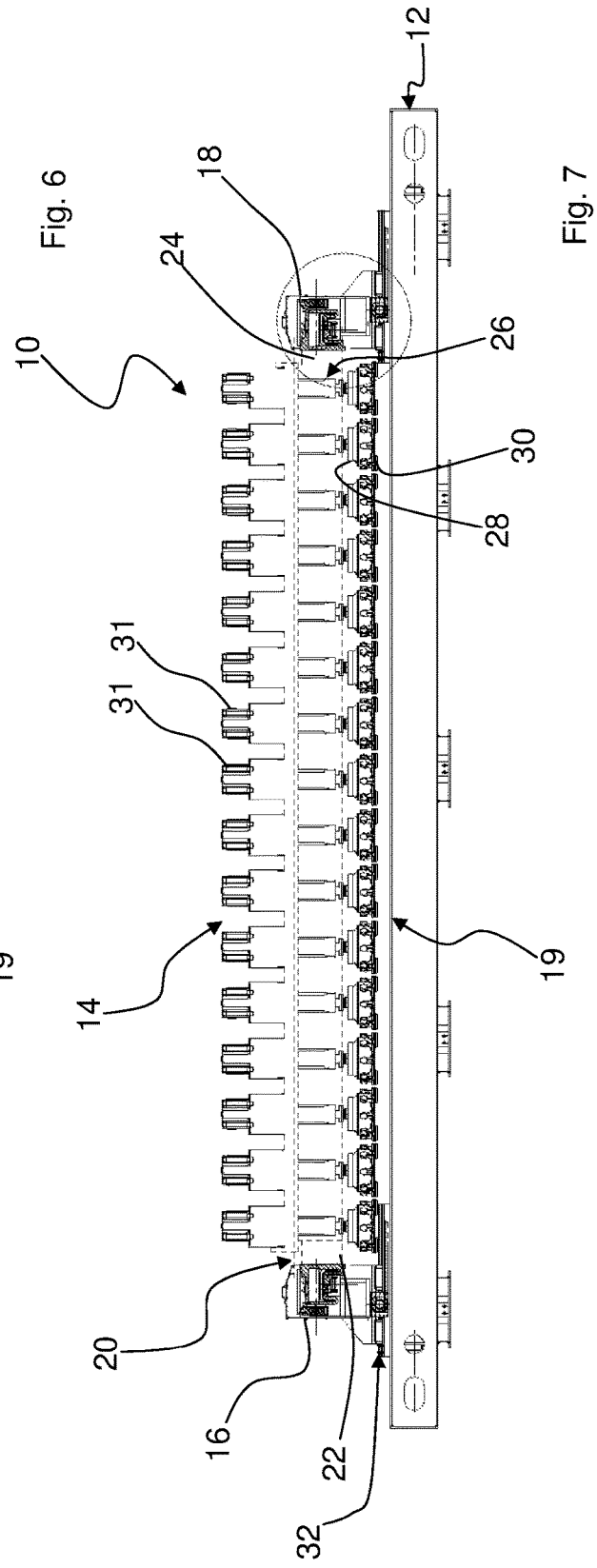

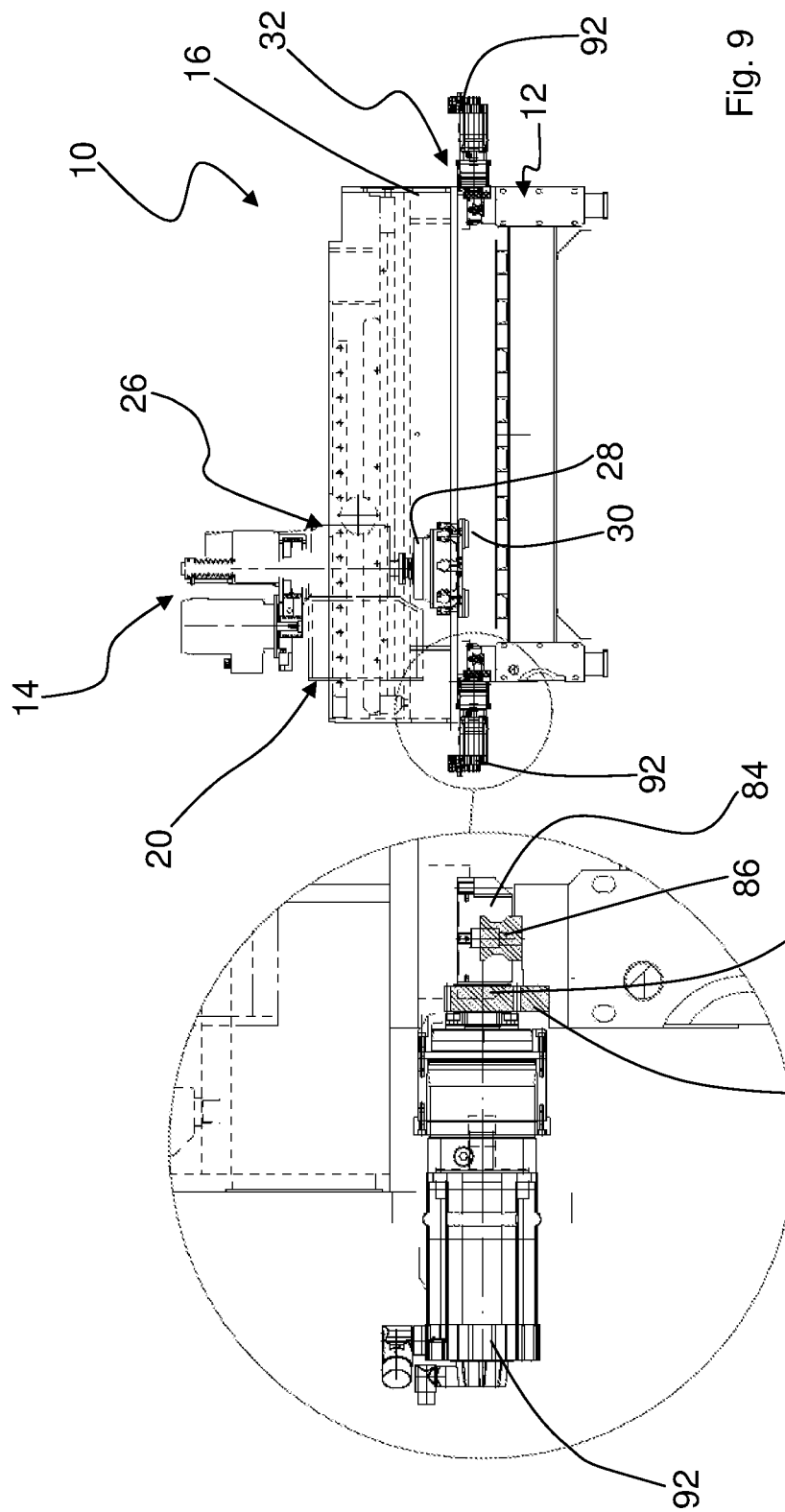

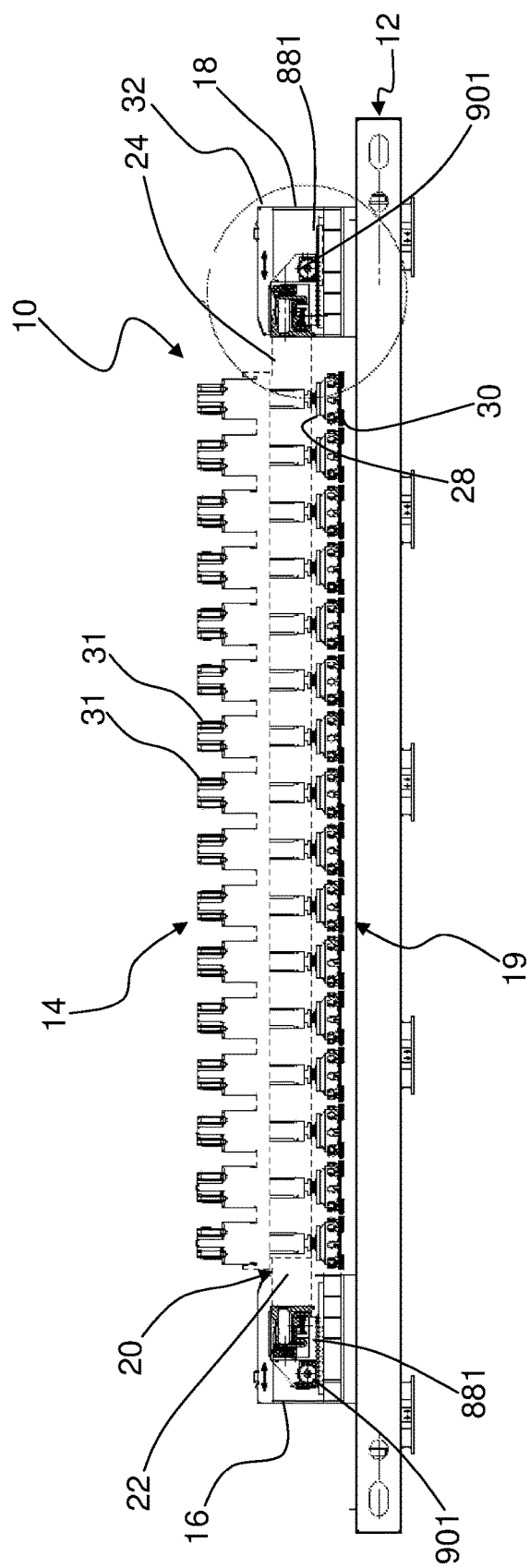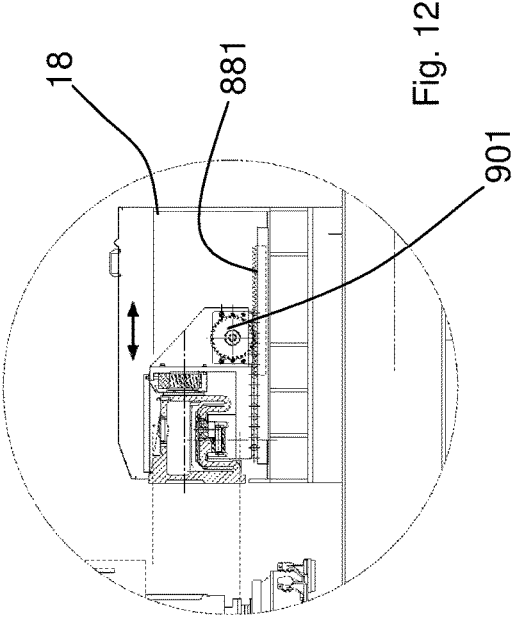
Fig. 11
Fig. 12

MACHINE FOR SMOOTHING AND/OR POLISHING SLABS OF STONE MATERIAL, SUCH AS NATURAL OR AGGLOMERATED STONE, CERAMIC AND GLASS

RELATED APPLICATIONS

This application is a 35 U.S.C. 371 national stage filing from International Application No. PCT/IB2014/066854, filed Dec. 12, 2014, which claims priority to Italian application No. TV2014A000021, filed Jan. 31, 2014 and Italian Application No. TV2013A000208, filed Dec. 13, 2013, the teachings of which are incorporated herein by reference.

FIELD OF THE INVENTION

The present invention relates to a machine for grinding and/or polishing slabs of stone material, such as natural or agglomerated stone, ceramics and glass.

BACKGROUND

This type of machine usually comprises a bench on which a conveyor belt for moving the slabs to be polished or ground travels in a longitudinal direction. Machines of this type further comprise two bridge support structures arranged on either side of the belt, one at the entry end for the material to be machined and the other one at the exit end for the machined material. The two bridge structures support a spindle-carrying beam at their ends.

The spindle-carrying beam has, mounted thereon, a series of vertical-axis grinding and/or polishing spindles or heads which are arranged in a row and which have, mounted on their bottom end, supports which rotate about the vertical axis of the spindle and on which in turn the abrasive tools are mounted.

The spindle-carrying beam performs an alternating movement in a transverse direction so as to grind the slabs arranged on the conveyor belt over their entire width. The amount of the displacement varies depending on the width of the material being machined.

The tools used are made using hard granular materials such as normally silicon carbide or diamond. In industrial applications abrasive granules usually are not used loose, but agglomerated so as to form an abrasive tool by means of a binding agent (which may be a cement, a resin, a ceramic material or a metal), which has the function of retaining the granules for as long as they perform their abrasive action, before disintegrating and allowing them to fall once worn.

The abrasive tools, as mentioned above, are normally fixed to a support which is rotated by a vertical-axis spindle.

In the case of soft stone materials, such as marble, the tool support, which has a prismatic form with flat surfaces, is generally an abrasive-holder plate.

In the case of hard stone materials, such as granite or quartz, the support is generally a head which imparts a specific movement to the tools which are varyingly shaped and in any case arranged radially. The head may be of the type with oscillating supports (so-called oscillating-segment head) or rotating supports with a substantially horizontal axis for roller-shaped tools (so-called roller head) or rotating supports with a substantially vertical axis for flat tools (called disc head or also planetary or orbital head).

The tools furthermore have a grain size gradually decreasing (from a few hundred micrometres down to a few micrometres) as the slab passes below them. In particular, the first spindle which operates on the slab to be ground has tools with a relatively large grain size, the second spindle has tools with a grain size which is slightly less big and so on, while tools with a very fine abrasive grain are mounted on the last spindle.

The spindle is slidable vertically and imparts to the tools resting on the surface of the material a pressure which may be of a mechanical, hydraulic or pneumatic nature; a pneumatic pressure is by far favoured and in this case the spindle—or "plunger"—is slidable vertically, being operated by a pneumatic pressure.

In this type of machine the spindles and, therefore, the grinding and/or polishing tools pause briefly when there is reversal in the movement since the spindle-carrying beam moves with a rectilinear alternating motion transversely with respect to the direction of feeding of the material.

This brief pause results in a very slight localized depression in the material which is sufficient, however, to create visible shadow zones, in particular on the ground or polished surface of particularly delicate dark materials.

In an attempt to the solve this problem, different machines have been devised, including that described in international patent application WO2011064706, which envisages a spindle-carrying beam and spindle-carrying structures rotating about a vertical axis on which the spindles are mounted in an eccentric position. In this type of machine in which the head is defined as being orbital, the relative movement of tool and slab is a combination of movements consisting of:

the alternating movement of the beam in the transverse direction;
the movement of the material underneath the beam;
the rotation of the grinding/polishing head/plate mounted on the spindle;
the revolving movement of the spindles about the axis of rotation of the spindle-carrying structure;

There exists moreover another type of machine in which a plurality of bridge structures, arranged transversely with respect to the bench, are provided. One or two grinding and/or polishing spindles displaceable along the bridge structure are mounted on each bridge. In the case where there are two spindles per bridge structure, each spindle is movable independently in the transverse direction, namely each spindle is provided with its own drive, so that it may be moved independently along the bridge structure. Moreover, the bridge structures perform an orbital movement, being suspended on four link-rods, so that the amplitude of the orbital movement is a few centimetres, equal to the length of the link-rods.

In this type of machine, each tool is moved with a motion composed of:

a rotational motion about the vertical axis of the spindle;
an alternating transverse displacement due to the movement of the spindle along the bridge;
an orbital motion due to the movement of the bridge on the suspension rods;
a continuous longitudinal displacement due to the feeding of the material on the bench.

The machines described above, while being widely used, are not without drawbacks.

In fact, although the trajectories of the machine tools described above are sufficient to limit or avoid the aforementioned problems, said tools have an extremely complex design. In fact, in the first case, a structure for eccentrically supporting the spindles is provided, said technical solution complicating significantly the spindle movement mechanisms. In the second case, in an attempt to achieve uniformity in the surface machining of the slabs, each spindle is provided with a drive and has an independent movement, and therefore the system becomes very costly and complex.

BRIEF SUMMARY OF EMBODIMENTS OF THE INVENTION

The object of the invention is to overcome the drawbacks of the prior art, by providing a machine which is less complex than the machines of the prior art and which, at the same, is less costly.

Furthermore, a further task of the present invention is to provide a machine by means of which it is possible to obtain slabs which are ground and polished uniformly over their entire surface, avoiding machining marks or grooves and shadow zones, also in the case of dark and delicate materials, which are therefore not visible to the naked eye.

The object and the task are achieved with a machine according to claim 1 and a method according to claim 23.

In particular, the idea which has occurred is to provide a grinding and/or polishing machine for slabs of stone material, such as natural and agglomerated stone, ceramics or glass, comprising a support bench for the slabs to be machined and a machining station arranged above the support bench. The machining station comprises at least one pair of bridge support structures situated opposite each other and arranged transversely on either side of the support bench. The machine further comprises first means for relative movement in the longitudinal direction of machining station and slab on the support bench and at least one beam, the two ends of which are supported by the support structures. At least one rotating spindle with a sliding vertical axis is mounted on the at least one beam which is movable transversely on the support structures. A tool-holder support rotating about the axis of rotation of the spindle and carrying at least one abrasive tool is mounted on the bottom end of the spindle. The machine is characterized in that it comprises second means for relative movement of the at least one spindle with respect to the support bench in the longitudinal direction; and a programmable control unit for adjusting the alternating movement in the transverse direction of the beam and the alternating longitudinal movement due to the second means for relative movement of the at least one spindle.

As a result, the spindles, to which the tool-holder heads or plates are fixed, in addition to being moved transversely in an alternating manner by the transverse displacement of the spindle-carrying beam, also perform an alternating longitudinal movement being mounted slidably on the spindle-carrying beam or the beam itself being movable in an alternating manner in the longitudinal direction, or the machining station being movable in an alternating manner in the longitudinal direction above the bench.

Advantageously, the spindles move longitudinally along the beam in unison.

Advantageously, the transverse movement of the machining station, the transverse movement of the spindle-carrying beam and the longitudinal movement of the spindles are controlled by a control unit, so as to impart to each single spindle a programmed movement with a closed, for example curvilinear, and controlled-speed trajectory resulting from the composition of the two rectilinear movements.

In this way the grinding and/or polishing tool-holder heads or plates perform the following movements:
a rotational motion about the vertical axis of the spindle;
an alternating transverse rectilinear motion due to the transverse displacement of the spindle-carrying beam;
an alternating longitudinal rectilinear motion due to the displacement of the spindles relative to the support bench; and
a longitudinal displacement due to the feeding of the material on the support bench.

The interpolated composition of the linear movements, which is controlled by the computer in accordance with a programmable logic, allows the generation of closed curvilinear trajectories with a controlled and programmable speed, avoiding stopping of the heads on the material and thus preventing the formations of grooves and corresponding shadow zones.

BRIEF DESCRIPTIONS OF DRAWINGS

The characteristic features and advantages of a machine according to the present invention will become clearer from the description below of possible embodiments, provided solely by way of a non-limiting explanation, with reference to the accompanying drawings, in which:

FIG. 1 shows a schematic front view of a grinding and/or polishing machine according to the present invention;

FIG. 2 shows a top plan view of a grinding and/or polishing machine according to the present invention;

FIGS. 6 and 7 show side views of an alternative embodiment of a machine according to the present invention in two limit positions;

FIG. 9 shows a front view of the machine shown in FIGS. 6 and 7;

FIG. 10 shows a detail of the machine according to FIG. 9;

FIG. 11 shows a side view of an alternative embodiment of a machine according to the present invention; and FIG. 12 shows a detail of the machine according to FIG. 11;

DETAILED DESCRIPTION OF EMBODIMENTS OF THE INVENTION

Figure 3:
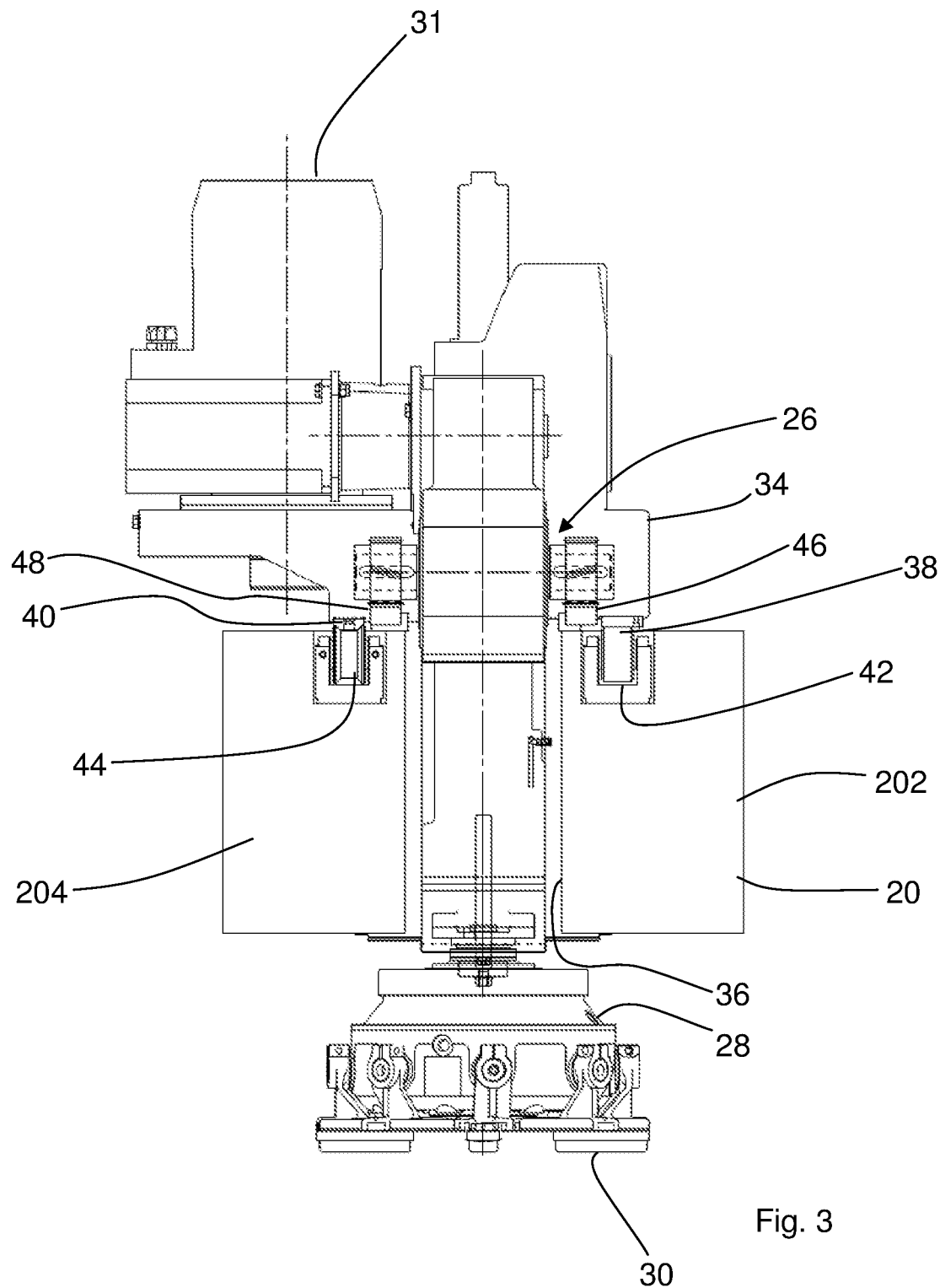
FIG. 3 shows a schematic view of the first and last spindle of FIGS. 1 and 2, with the displacement system for movement along the beam, viewed in cross-section.

FIG. 1 shows a grinding and/or polishing machine for slabs of stone material, such as natural and agglomerated stone, ceramics or glass according to the present invention, denoted generically by the reference number 10.

The machine 10 comprises a support bench 12 for the slabs to be machined and, on top of it, at least one machining station 14.

The machining station 14 comprises at least one pair of bridge support structures 16, 18 situated opposite each other and arranged transversely on either side of the support bench 12, and at least one beam 20, the two ends 22, 24 of which are supported by the support structures 16, 18. The beam 20 is movable in the transverse direction on the support structures 16, 18 over the entire transverse width of the working surface of the bench, namely the entire maximum width of a slab to be machined on the bench. A suitable drive 21 causes displacement of the beam in the transverse direction. This drive 21 may be advantageously formed by two motor units 21 arranged at the two ends of the beam and synchronized with each other.

The machine 10 further comprises first means 19 for relative movement in the longitudinal direction of machining station 14 and slab on the support bench 12. In accordance with a preferred embodiment of the present invention, the first relative movement means 19 may consist of a conveyor belt 23 which causes feeding of the slab with a constant movement, mainly at a fixed speed. In accordance with alternative embodiments, the slabs may remain stationary with respect to the support bench 12, and the machining station 14 is movable in the longitudinal direction from one end to the other of the support bench 14.

Owing to said relative movement means 19 a slab being machined may move with a relative motion underneath the machining station over its entire length, entering at one end of the station and exiting from the opposite end and being subject to the action of all the machining heads over its entire surface.

At least one rotating spindle 26 with a sliding vertical axis is mounted on the beam 20. At least one tool-holder support 28 rotating about the axis of rotation of the spindle 26 and carrying at least one abrasive tool 30 is mounted on the bottom end of the spindle 26. Each spindle advantageously has its own rotational motor 31.

Grinding and/or polishing heads are thus formed. The sliding vertical axis allows, for example, raising of the heads at the end of machining and/or adjustment of the contact pressure of the heads on the slab being machined.

Preferably, the grinding and/or polishing spindles or heads consist of a plurality and are arranged in sequence on the beam in the longitudinal direction. Advantageously, the sequential heads have a grain size of the abrasive tool which gradually decreases in the direction of relative movement of the slab with respect to the station, so that the slab performing a slow relative movement is subject gradually to the action of tools with an increasingly finer grain size.

In the embodiment shown in FIGS. 1 and 2, for example sixteen heads or spindles 26, provided with a tool-holder support 28 for oscillating tools, are mounted on the beam. In accordance with alternative embodiments of the present invention, the tool holder (or machining head) support 28 may be provided with other tools, as described in the introductory part of the present description.

The machine 10 according to the present invention comprises second relative movement means 32 which are designed to move the at least one spindle 26 in the longitudinal direction with respect to the support bench 12.

In accordance with a first embodiment of the present invention, shown in FIGS. 1-5, the machine 10 may comprise second relative movement means 32 which are designed to move the at least one spindle 26 along the beam in the longitudinal direction with respect to the support bench 12.

The second relative movement means may allow each spindle 26 to move along the beam 20.

Advantageously, as will be clarified below, the amplitude of this movement, which may be adjustable, is limited and, in particular in the case of a plurality of spindles arranged close together and with a combined movement, may have a maximum value preferably ranging between one and two times, and in particular about 1.5 times, the diameter of the working circumference of the tool rotating on the spindle.

FIG. 1 shows, by way of example, the position of the spindles at one end of their longitudinal travel path (spindles all on the right as viewed in FIG. 1) and, in broken lines (for clarity only the left-hand spindle in FIG. 1), the opposite end of the longitudinal travel path (spindles all on the left as viewed in FIG. 1).

FIGS. 1-3 show a first embodiment of a machine according to the present invention.

As can be clearly seen in FIG. 3, where the beam 20 is shown cross-sectioned, it can be noted that the beam 20 advantageously carries a slide 34 which in turn supports the spindles and slides over the beam. For example, the beam 20 may advantageously comprise two parallel longitudinal structures 202, 204 which are rigidly connected together, spaced from each other and in between which the spindles pass.

In accordance with this embodiment, the spindles 26 are mounted, in succession with each other, on the longitudinal spindle-carrying slide 34 which travels along the beam 20. Advantageously, the slide 34 is provided with a series of cavities or receiving seats inside which the spindles 26 are inserted and mounted. A slide drive allows the slide to perform its longitudinal sliding movement with the spindles. The second means for longitudinal movement of the spindles are thus formed.

In particular, the two longitudinal structures 202, 204 of the beam 20 may be suitably arranged and spaced relative to each other, with a fixing system at the ends, so as to form between them a cavity 36 inside which the spindles 26 mounted on the slide 34 may move.

In accordance with a first embodiment of the present invention, the spindle-carrying slide or structure 34 is advantageously provided with two guides: a flat guide 38 and a V-shaped guide 40. The guides 38, 40 are arranged in a horizontal direction (direction parallel to the bench 12) and are directed towards the longitudinal structures 202, 204, respectively. The guides 38, 40 rest and travel on wheels 42, 44, with a flat profile and V-shaped profile, respectively, which are mounted arranged in sequence with each other on the longitudinal structure 202 and 204 of the beam 20, respectively. This ensures easier travel of the slide despite the length of the beam and compensates for any small misalignments and expansion. The embodiment illustrated in FIG. 1 shows twelve pairs of wheels 44 by way of example.

In accordance with a possible embodiment of the present invention, racks 46, 48, 50, 52 are mounted at the end of the beam (for example of each of the two longitudinal structures 202, 204 of the beam 20). The spindle-carrying slide 34 (see FIG. 3) may be provided, at the two ends 342, 344, with two synchronous drives 346, 348 which cause rotation of two pinions 350, 352 and 354, 356, respectively. The pinions 350, 352 and 354, 356 mesh inside the respective racks 46, 48, 50 and 52 located at the ends of the two longitudinal structures 202, 204 of the beam 20.

Operation of the two synchronous drives 346, 348 causes rotation of the pinions 350, 352 and 354, 356 which mesh with the racks 46, 48, 50 and 52 and cause the controlled sliding of the slide 34 such that all the spindles are moved in unison in an alternating manner along the beam.

The maximum adjustable amplitude of the longitudinal movement of the spindles 26 on the beam 20 may be fairly broad and may even be more than 1,000 mm.

In accordance with a possible embodiment of the present invention (not shown in the accompanying figures) only one drive 346 may be provided for the movement of the slide 34 and only one or two racks at the corresponding end of the slide.

Other types of drive may also be provided (not shown in the attached figures, but obvious per se for the person skilled in the art), using for example screws or pistons or link-rod/crank mechanisms, etc.

According to alternative embodiments of the present invention, instead of providing two rows of fixed wheels for example on each of the two longitudinal structures of the beam and guides formed on a slide which supports the spindles, it may be envisaged providing each spindle with wheels or sliding shoes which travel along guides situated on the beam, thus eliminating the longitudinal spindle-carrying structure/slide, each spindle being coupled together with the adjacent spindles, thus simplifying further the means for longitudinal movement of the spindles.

Figure 4:
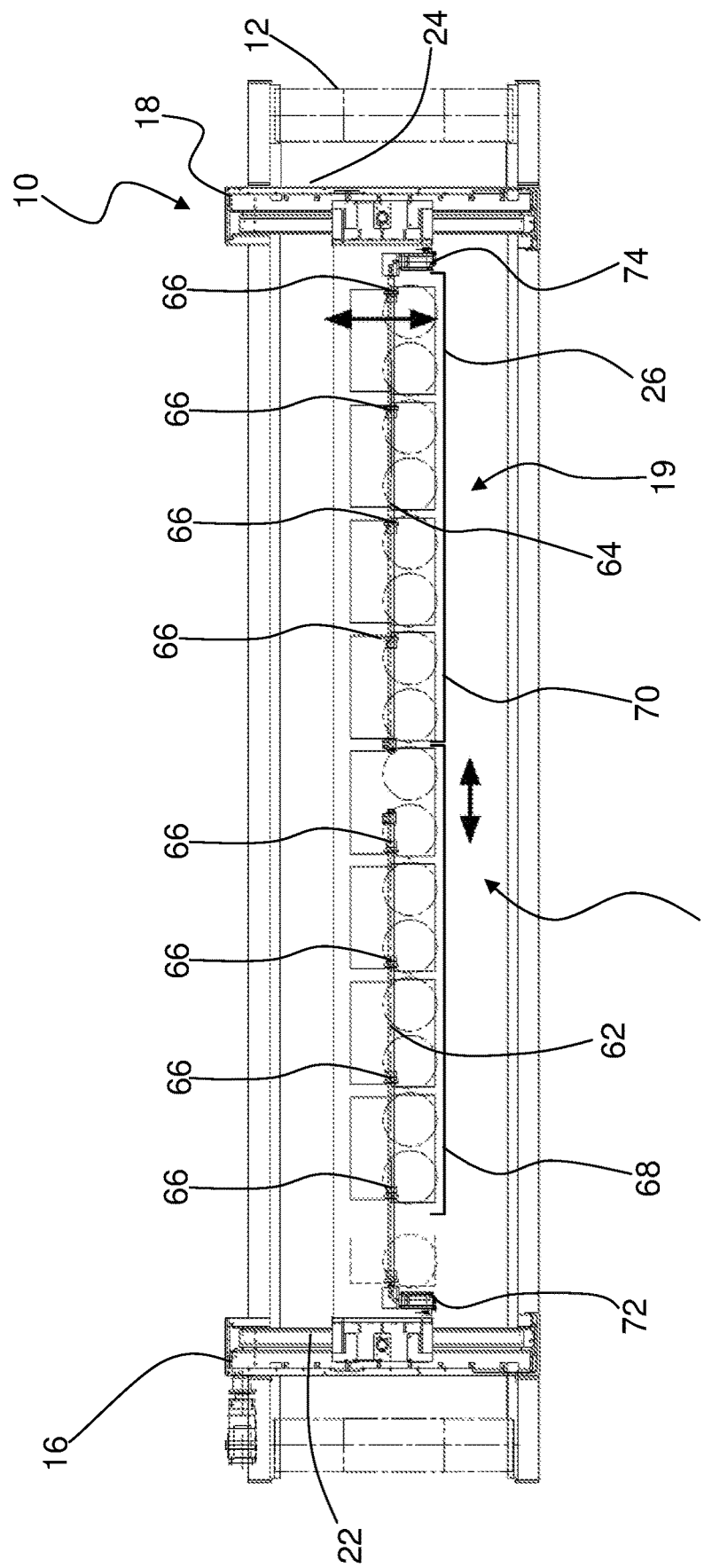
FIG. 4 shows a schematic view, from above, of a second embodiment of a machine according to an alternative embodiment of the present invention.
Figure 5:
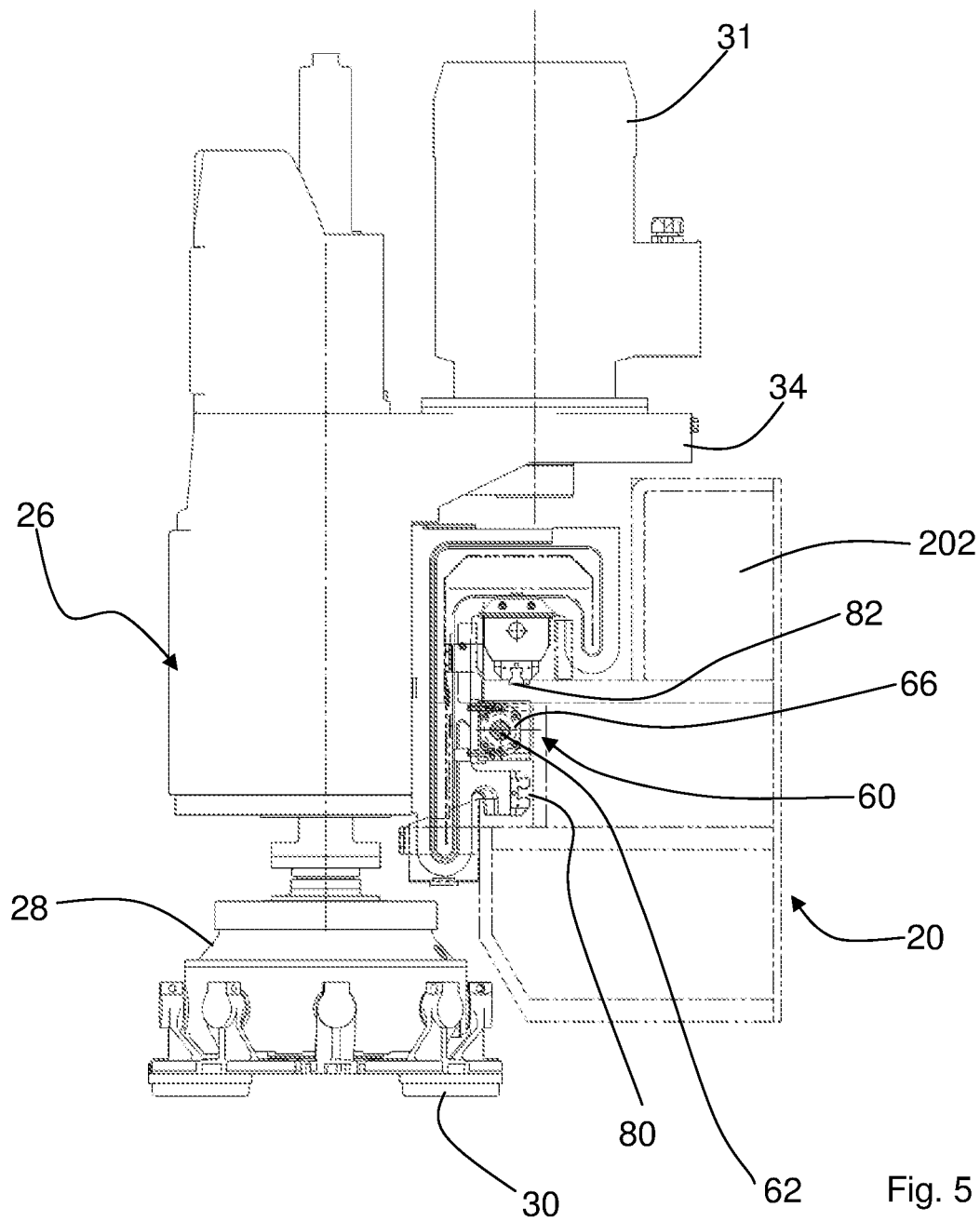
FIG. 5 shows a side view of a spindle according to FIG. 4, with the cross-section of the beam and the displacement system for movement along the beam.

FIGS. 4 and 5 show a possible second embodiment of the invention in which the beam 20 comprises only one longitudinal structure 202 and the spindles 26 are not inserted inside the beam 20, but are mounted projecting from it.

In accordance with this embodiment of the invention, the second means 32 for performing the relative movement in the longitudinal direction of the at least one spindle 26 with respect to the support bench 12 comprise advantageously a screw/female thread mechanism 60. The screw/female thread mechanism 60 may comprise one or more motor-driven screws 64 which extend entirely or partly over the length of the beam 20, and the spindle 26 may be provided with a lead nut 66.

Advantageously the lead nut 66 may be of recirculating ball type.

In the embodiment shown in FIGS. 4 and 5, the spindles 26 are for example fixed together in pairs and therefore it is sufficient for only one spindle 26 of each pair to be provided with a lead nut 66, thus simplifying the constructional design.

In accordance with a possible embodiment of the present invention, the spindles 26 may also be divided into groups, with each group moved by an associated motor-driven screw. For example, as can be clearly seen in FIG. 4, the spindles may be divided into two groups 68, 70 each comprising eight spindles 26 fixed together, and with two motor-driven screws 62, 64, one per group of spindles. The motor-driven screws 62, 64 are moved by means of motor means 72, 74 situated at the ends of the beam 20. Advantageously, the motor means 72, 74 of the two motor-driven screws 62, 64 are synchronized with each other so that the two groups 68, 70 of spindles 26 move in unison.

With reference now to FIG. 5, it can be noted that each spindle 26 is advantageously slidable along the beam 20 by means of two guides 80, 82 extending along the beam: a first guide 80 arranged vertically so as to provide a lateral support for the spindle, and a second guide 82 arranged horizontally so as to provide a vertical support for the spindle.

In accordance with alternative embodiments of the present invention it is possible to use also a single motor-driven screw with motor means arranged at one end only, or with a single motor means for each end.

In accordance with alternative embodiment, in this case also different systems, such as racks, pistons or link-rod/crank systems, could be used.

According to a possible alternative embodiment, it is possible to provide a single fixed screw and a motor-driven lead nut for each spindle. Each spindle would therefore be provided with a drive for movement of the lead nut.

In accordance with a possible embodiment of the present invention, the machine 10 may comprise a control unit, advantageously of the programmable microprocessor type. Advantageously the control unit adjusts the movement in the transverse direction of the beam and the movement in the longitudinal direction of the spindles by operating the respective movement means. In accordance with alternative embodiments, the control unit also adjusts the movement of the first relative movement means. The control unit (known per se, for example a suitable programmable industrial controller) may control in a synchronized manner the various movements so as to obtain complex trajectories of the machining tools on the slabs being machined. For a precise synchronized control, the movement means may comprise a feedback control system, with suitable position sensors, such as incremental or associated encoders, as may be easily imagined by the person skilled in the art.

In accordance with a possible embodiment of the present invention, the movement of the single spindles along the beam may be rendered independent by providing a drive for each spindle, in order to move each spindle along the beam independently. It is thus possible to define varied paths for each spindle and therefore for each abrasive grain.

There exist, however, a number of advantages in keeping the movement of the spindles synchronized, in that:
  it simplifies the constructional design of the machine;
  it simplifies the management of the machine; and
  the amplitude of the longitudinal movement of the spindles is fully exploited and it is therefore possible to install the largest possible number of spindles on the beam.

In particular, owing to the simplicity of the structure in the longitudinal direction of the machine, it is possible to use easily a relatively large number of machining heads with a smaller length of the machine. For example, it is possible to obtain a machine with a length only slightly greater than the sum of the diameters of all the machining heads plus the desired longitudinal travel for these heads, as may be easily imagined from FIG. 2. Moreover, also with a large number of heads, the cost of the machine may remain relatively low, a more complicated or redundant system for moving the heads not being necessary.

Figure 8:
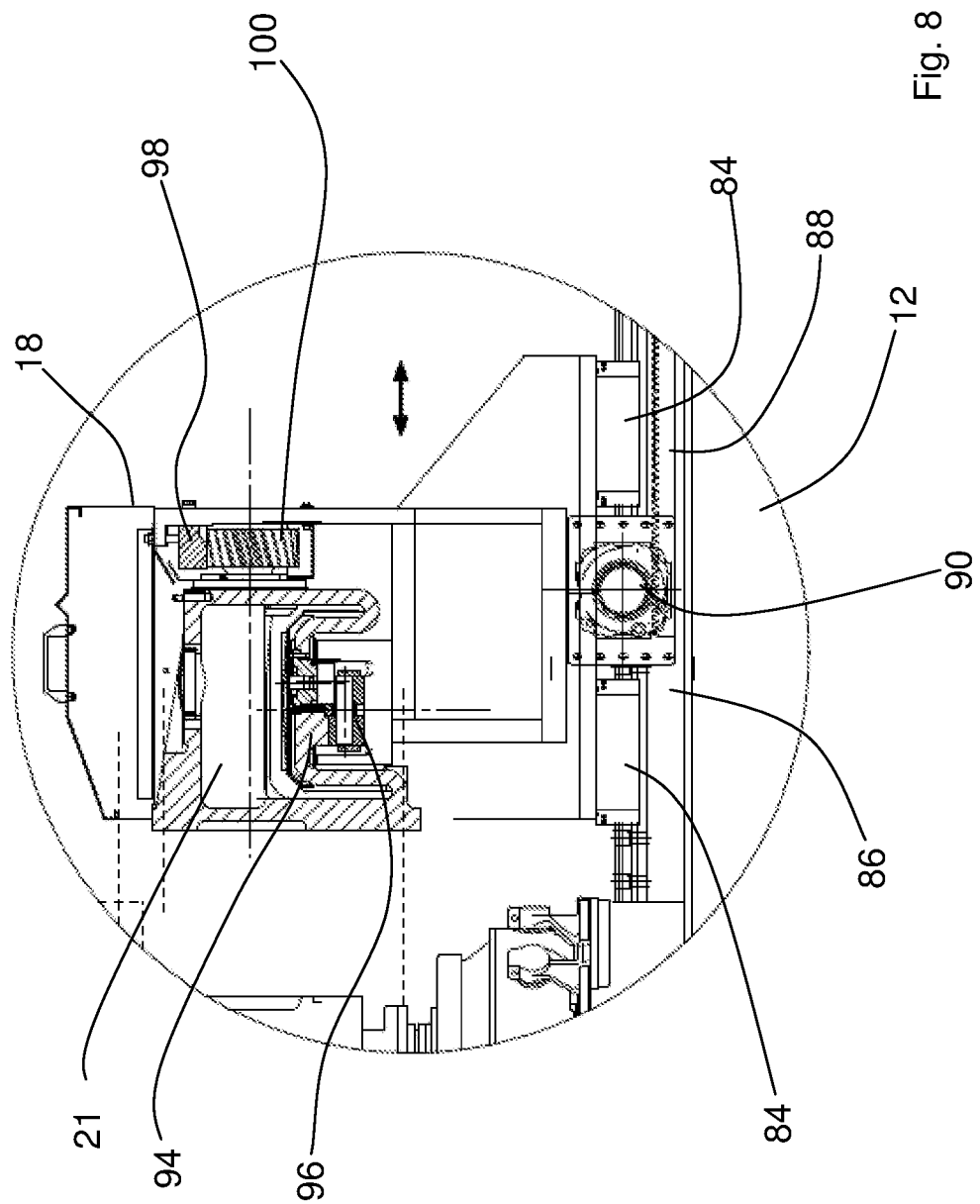
FIG. 8 shows a detail of the machine according to FIG. 7.

In particular in FIG. 8, the ends of the beam rest with a shoulder 94 on a roller cage 96 so as to be able to be displaced transversely. A pinion 100 with an associated drive 21, which is designed to engage with a respective rack 98 arranged on each support structure 16, 18, is also provided on each shoulder of the beam 20. The rotation of the pinions 100 produced by the associated drives 21 allows the pinions to move on the respective racks 98, causing the movement of the beam in the transverse direction.

In accordance with a possible alternative embodiment of the present invention, the pinions 100 and the associated drives 21 may be provided on the support structure and the racks 98 on the beam 20.

In one possible embodiment of the present invention, shown for example in FIG. 6, the machine 10 further comprises first means 19 for the relative movement in the longitudinal direction of machining station 14 and slab on the support bench 12. In accordance with a possible embodiment of the present invention, the first relative movement means 19 may consist of a conveyor belt.

Owing to said relative movement means 19 a slab being machined may move with a relative motion, preferably at a constant speed, underneath the machining station 14 over its entire length, entering at one end of the station and exiting from the opposite end and being subject to the action of all the machining heads over its entire surface.

At least one rotating spindle 26 with a sliding vertical axis is mounted on the beam 20. At least one tool-holder support 28 rotating about the axis of rotation of the spindle 26 and carrying at least one abrasive tool 30 is mounted on the bottom end of the spindle 26. Each spindle advantageously has its own rotational motor 31.

Grinding and/or polishing heads are thus formed. The sliding vertical axis allows, for example, raising of the heads at the end of machining and/or adjustment of the contact pressure of the heads on the slab being machined.

Preferably, the grinding and/or polishing heads consist of a plurality and are arranged in sequence on the beam in the longitudinal direction. Advantageously, the sequential heads have a grain size of the abrasive tool which gradually decreases in the direction of relative movement of the slab with respect to the station, so that the slab performing a slow relative movement is subject gradually to the action of tools with an increasingly finer grain size.

In accordance with possible embodiments of the present invention, in FIGS. 6-10 the second relative movement means 32 perform the movement of the machining station, while in FIGS. 11 and 12 the second movement means 32 perform the relative rectilinear movement of the beam 20 with respect to the support bench 12 in the longitudinal direction.

In the embodiment shown in FIGS. 6 and 7, for example sixteen spindles 26, provided with a tool-holder support 28 for oscillating tools, are mounted on the beam. In accordance with alternative embodiments of the present invention, the tool holder (or machining head) support 28 may be provided with other tools, as described in the introductory part of the present description.

As mentioned above, the machine 10 according to the present invention comprises second relative movement means 32 designed to move with an alternating rectilinear motion the machining station in the longitudinal station with respect to the support bench 12.

As will be clarified below, the amplitude of this travel movement, which may be adjustable, is limited and may have a maximum value preferably ranging between one and two times, and in particular about 1.5 times, the diameter of the working circumference of the tool rotating on the spindle.

In accordance with a possible embodiment of the present invention, the maximum amplitude of the longitudinal movement of the beam 20 may be fairly broad and may also be more than 1,000 mm.

FIGS. 6-10 show an embodiment of a machine according to the present invention. FIG. 6 shows by way of example the position of the beam 20 at one end of the longitudinal travel path (fully displaced to the right) and in FIG. 7 the position of the beam 20 at another end of the longitudinal travel path (fully displaced to the left).

In this embodiment, the alternating movement in the longitudinal direction of the beam is obtained using second relative movement means 32 designed to move the machining station 14. The machining station 14, which comprises the pair of bridge support structures 16, 18 and the beam 20, is designed to move in an alternating manner along rectilinear guides arranged directly on the support bench 12 or on the sides thereof.

With reference to FIG. 9, and in particular to FIG. 10, it can be noted that each bridge support structure 16, 18 may be provided with at least one sliding shoe 84 designed to slide on a rectilinear guide 86. The rectilinear guide 86 may be arranged on the support bench 12, as shown in the figure, or may be positioned alongside the support bench 12.

The second relative movement means 32 may comprise at least one rack 88 for each support structure 16, 18, fixed to the support bench 12. Advantageously, the racks may be two in number for each support structure 16, 18, arranged on the sides of the beam 20. The support structure may be provided with movement pinions 90 designed to mesh with the racks 88 in order to move the machining station 14. Each movement pinion 90 may be provided with its own drive 92, as can be clearly seen from the front view of FIG. 10. Advantageously, the drives 92 are synchronized with each other so as to move the machining station simultaneously and in the same direction.

In accordance with an alternative embodiment of the present invention, not shown in the attached figures, the racks 88 may be provided on the support structures and the pinions 90 and the associated drives 92 may be provided on the support bench 12.

In the description of the second movement systems reference has been made to the fact that at least part of them is situated on the support bench; however, it is evident that they may alternatively be arranged on the sides of the support bench as will be obvious to the person skilled in the art in the light of the description provided above of these means. They may be provided for example on special supports arranged laterally with respect to the support bench.

FIGS. 11 and 12 show an alternative embodiment of the present invention, in which the second relative movement means 32 are designed to move the beam 20 in the longitudinal direction in an alternating manner with respect to the support structures.

Therefore, differently from the preceding example, the beam 20 is designed to move in the transverse and longitudinal direction, above the fixed support structures 16, 18. Advantageously, the beam is displaced transversely on the support structures 16, 18 and moreover moves longitudinally with an alternating rectilinear motion above the said structures 16, 18.

According to a possible embodiment of the present invention, the second relative movement means 32 comprise at least one rack 881 for each support structure 16, 18 fixed to the top thereof. Advantageously, the racks may be two in number for each support structure 16, 18, arranged on the sides of the beam 20. The beam may be provided with movement pinions 901, for example on suitable lateral structures, designed to mesh with the racks 881 in order to move the beam. Each movement pinion 901 may be provided with its own drive (not shown). Advantageously, the drives of the pinions are synchronized with each other so as to move the beam 20 simultaneously and in the same direction.

In the above description reference was made to drives of the rack and pinion type for moving the beam in the longitudinal and transverse direction. In accordance with alternative embodiments of the present invention, other types of drive may also be provided (not shown in the attached figures, but now obvious per se for the person skilled in the art), using for example recirculating-ball screws, hydraulic or pneumatic pistons, or link-rod/crank mechanisms, etc.

In accordance with a possible embodiment of the invention, the second means 32 for relative movement of the beam in the longitudinal direction comprise screw/female thread mechanisms. The screw/female thread mechanisms may comprise one or more motor-driven screws which extend along the sides of the beam 20 on the support structures, and lead nuts provided on said beam.

In accordance with an alternative embodiment, the motor-driven screws may be provided on beam, while the lead nuts may be provided on the support structures.

Advantageously the lead nuts may be of recirculating ball type.

In accordance with this embodiment, the machine 10 may comprise a control unit, advantageously of the programmable microprocessor type. Advantageously the control unit adjusts the movement of the beam in the transverse and longitudinal direction by operating the respective movement means. In accordance with alternative embodiments, the control unit also adjusts the movement of the first relative movement means. The control unit (known per se, for example a suitable programmable industrial controller) may control in a synchronized manner the various movements so as to obtain complex trajectories of the machining tools on the slabs being machined. For a precise synchronized control, the movement means may comprise a feedback control system, with suitable position sensors, such as incremental or associated encoders, as may be easily imagined by the person skilled in the art.

Owing to interpolation of the transverse and longitudinal movements of the beam with controlled speeds it is possible to grind and/or polish in a uniform manner the slabs since the spindles are prevented from stopping for too long on any zones of the slabs to be ground, thus avoiding the aforementioned problems.

In this case also, owing to the simplicity of the structure in the longitudinal direction of the machine, it is possible to use easily a relatively large number of machining heads with a smaller length of the machine. For example, it is possible to obtain a machine with a length only slightly greater than the sum of the diameters of all the machining heads plus the desired longitudinal travel for these heads, as may be easily imagined from FIG. 7. Moreover, also with a large number of heads, the cost of the machine may remain relatively low, a more complicated or redundant system for moving the heads not being necessary.

For example, it has been found to be advantageous, according to a possible mode of operation of the present invention, if, during operation of the machine, the material feeding speed is constant, while the speed of transverse displacement of the beam 20 and the speed of longitudinal displacement of the spindles 26 (obtained by means of the movement of the spindles along the beam, or by means of the movement of the beam itself, or by means of movement of the machining station) may be adjusted by the control unit in an interpolated manner so as to be able to define specific trajectories for the grinding heads 28 provided by the combination of the two displacement movements: the transverse displacement of the beam and the longitudinal displacement of the spindles.

The speed of travel along the trajectories may be constant or more preferably variable and programmed, so as to modulate as required the contact time of the tools 30 along the trajectory and therefore in the different zones of the slab and/or for different moments of contact of the tools with the slab.

With a machine according to the invention it is thus possible to define easily closed trajectories for the grinding/polishing heads substantially without stoppage points, reversal points and/or angled points. In this way blemishes on the surface of the machined product are substantially avoided.

FIGS. 13, 14, 15 and 16 illustrate possible trajectories of the spindle obtained by means of the synchronization by the control unit of the longitudinal and transverse movements of the spindle, repetition of which allows the entire surface of a slab to be machined. Preferably, FIGS. 13-16 show the transverse movement of the beam with the spindles along the vertical axis.

Figure 13:
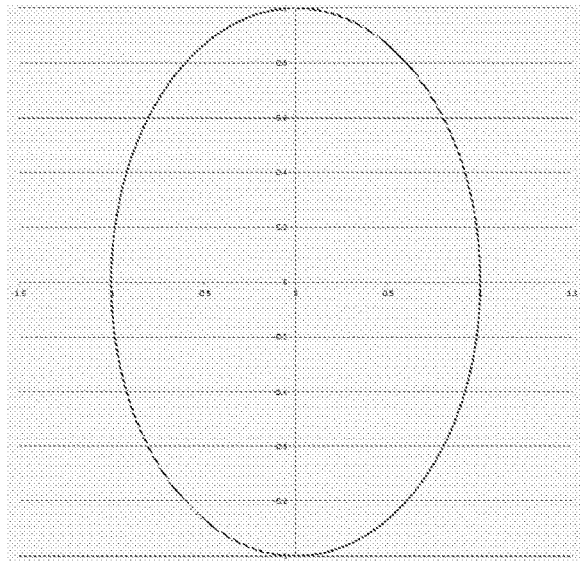
FIGS. 13 to 16 show possible closed interpolated trajectories which the grinding heads may be made to follow.
Figure 14:
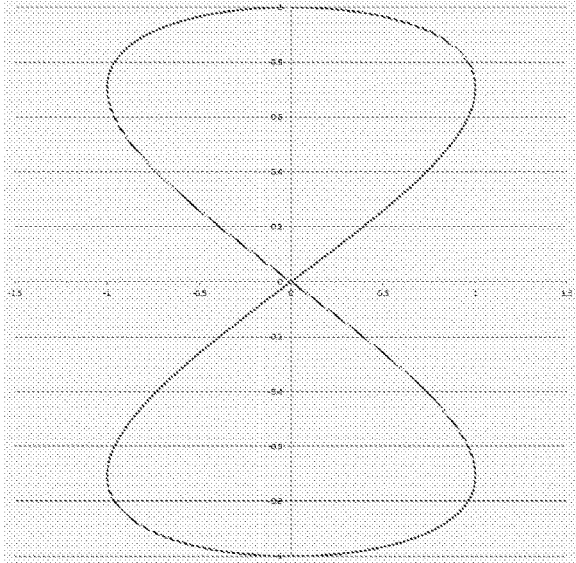
Figure 15:
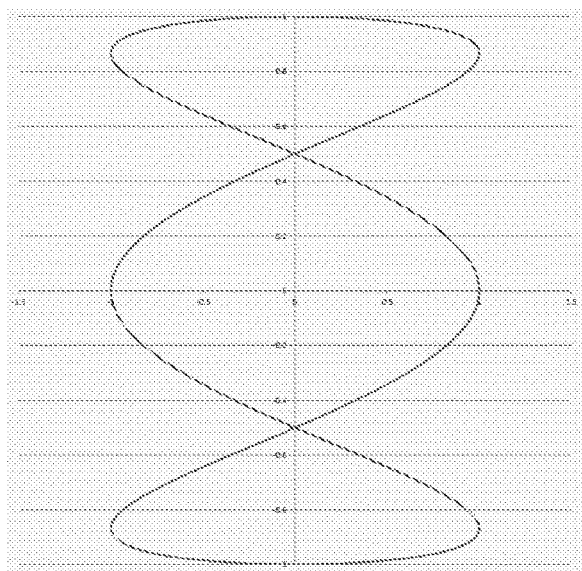
Figure 16:
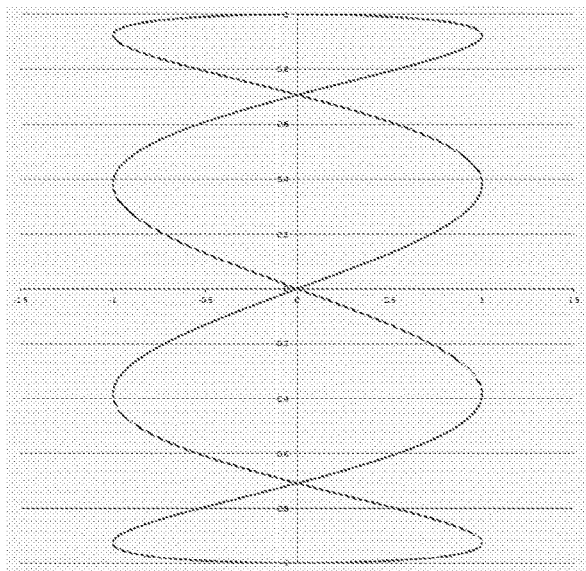

FIG. 13 shows a simple ellipsoidal trajectory, while the other figures show intersecting trajectories; mixed trajectories characterized by successive repetition of the different trajectories of FIG. 13 are also possible.

Owing to the combined movement of the spindle and in particular the interpolation of the transverse movements of the beam and the longitudinal movement of the spindles with controlled speeds it is possible to grind and/or polish in a uniform manner the slabs since the spindles are prevented from stopping for too long on any zones of the slabs to be ground, thus avoiding the aforementioned problems.

The person skilled in the art, in order to satisfy specific requirements, may make modifications to the embodiments described above and/or replace the parts described with equivalent parts, without thereby departing from the scope of the accompanying claims.

The invention claimed is:

1. A machine for one or more of grinding and polishing slabs of stone material, such as natural or agglomerated stone, ceramics or glass, comprising:
 a support bench for the slabs to be machined and being provided above the support bench;
 at least one machining station comprising at least one pair of bridge support structures situated opposite each other and arranged transversely on either side of the support bench, a first means for performing a relative movement in the longitudinal direction between the machining station and a slab on the support bench and at least one beam, the two ends of which are supported by said support structures;
 a plurality of rotating spindles with a sliding vertical axis mounted on said at least one beam, said beam being movable transversely on said support structures, a bottom end of each of the plurality of spindles being provided with at least one tool-holder support rotating about the axis of rotation of said plurality of spindles and carrying at least one abrasive tool for forming the grinding and/or polishing heads;
 characterized in that the machine further comprises:
 second means for relative movement of said at least one spindle with respect to the support bench in the longitudinal direction, wherein said second relative movement means perform a movement, in the longitudinal direction along the beam, of the plurality of spindles with respect to the support bench, and wherein the plurality of spindles move in unison in the longitudinal direction along the beam; and
 a programmable control unit for adjusting an alternating movement in the transverse direction of the beam and an alternating longitudinal movement due to the second means for relative moment of the at least one spindle to control in a synchronized manner the longitudinal movements so as to obtain trajectories of the machining tools on the slabs being machined, whereby speed of travel and contact time of the tools along the trajectories are variably programmable parameters of the control unit.

2. The machine according to claim 1, characterized in that said first relative movement means comprise a conveyor belt.

3. The machine according to claim 1, characterized in that the plurality of spindles are mounted on a slide which travels in the said longitudinal direction along the beam upon operation of the said second relative movement means.

4. The machine according to claim 1, characterized in that an adjustable amplitude of the travel movement due to the second relative movement means along the beam is limited and has a maximum value of between one and two times the diameter of the working circumference of the rotating tool on the spindle.

5. The machine according to claim 1, characterized in that the beam may comprise two spaced and parallel longitudinal structures which are rigidly connected together and on which a longitudinal spindle-carrying slide travels.

6. The machine according to claim 5, characterized in that said slide comprises a flat guide and a V-shaped guide for corresponding wheels provided on the longitudinal structures of the beam.

7. The machine according to claim 5, characterized in that the beam is provided with racks engaged by pinions provided on the spindle-carrying slide so as to move the racks alternately in the longitudinal direction, said pinions receiving the movement from synchronous drives provided on the slide.

8. The machine according to claim 1, characterized in that the machine comprises a longitudinal structure, on which the spindles are mounted projecting so as to be able to move in an alternating manner in the longitudinal direction.

9. The machine according to claim 1, characterized in that the spindles are divided into two groups along the beam, each comprising motor-driven screws which are moved by means of respective motor means synchronized with each other so that the two groups of spindles move in unison.

10. The machine according to claim 1, characterized in that said second relative movement means are designed to displace the machining station in the longitudinal direction in an alternating manner above the support bench.

11. The machine according to claim 10, characterized in that said second relative movement means comprise at least one sliding shoe provided on each bridge support structure and designed to slide on a rectilinear guide arranged on the support bench.

12. The machine according to claim 10, characterized in that the second relative movement means comprise at least one rack for each support structure, fixed to the support bench, each of the support structures being provided with movement pinions designed to mesh with the racks in order to move the machining station.

13. The machine according to claim 1, characterized in that said second relative movement means are designed to displace the beam in the longitudinal direction in an alternating manner above the fixed support structures.

14. The machine according to claim 13, characterized in that the second relative movement means comprise at least one rack for each support structure, fixed thereto, the beam being provided with movement pinions designed to mesh with the racks in order to move the beam in the longitudinal direction.

15. The machine according to claim 13, characterized in that said second relative movement means comprise at least one sliding shoe provided on the beam and designed to slide on a rectilinear guide arranged on the support structures.

16. The machine according to claim 15, characterized in that an adjustable amplitude of the sliding movement due to said second relative movement means is limited and has a maximum value of between one and two times the diameter of the working circumference of the rotating tool on the spindle.

17. The machine according to claim 16, characterized in that the control unit is designed to interpolate the alternating movement of the beam in the transverse direction and the alternating longitudinal movement due to the second relative movement means of the at least one spindle for defining predetermined closed trajectories for the grinding and/or polishing heads.

18. The machine according to claim 17, characterized in that the speed of travel along the trajectories for the grinding and/or polishing heads is constant.

19. A method for grinding and/or polishing slabs using a machine according to claim 1, in which the alternating movement of the beam in the transverse direction and the alternating longitudinal movement of the at least one spindle are interpolated so as to define predetermined controlled-speed closed trajectories for the grinding and/or polishing heads.

* * * * *